(12) United States Patent
Herold et al.

(10) Patent No.: US 10,407,540 B2
(45) Date of Patent: Sep. 10, 2019

(54) COMPOSITION FOR OPTICAL ARTICLES AND OPTICAL ARTICLES MADE THEREWITH

(71) Applicant: PPG Industries Ohio, Inc., Cleveland, OH (US)

(72) Inventors: Robert D. Herold, Monroeville, PA (US); Vivek Badarinarayana, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 180 days.

(21) Appl. No.: 15/258,495

(22) Filed: Sep. 7, 2016

(65) Prior Publication Data

US 2017/0066876 A1 Mar. 9, 2017

Related U.S. Application Data

(60) Provisional application No. 62/215,250, filed on Sep. 8, 2015.

(51) Int. Cl.
  *C08G 64/02* (2006.01)
  *C08F 18/24* (2006.01)
  *C09D 4/00* (2006.01)

(52) U.S. Cl.
  CPC .......... *C08G 64/0291* (2013.01); *C08F 18/24* (2013.01); *C09D 4/00* (2013.01)

(58) Field of Classification Search
  CPC ... C09K 9/02; G02B 1/10; G02B 5/22; G02B 5/23; G02B 5/223; G02C 7/10
  See application file for complete search history.

(56) References Cited

U.S. PATENT DOCUMENTS

| | | |
|---|---|---|
| 5,196,492 A | 3/1993 | Renzi et al. |
| 5,599,876 A | 2/1997 | Renzi et al. |
| 6,057,411 A * | 5/2000 | Herold ............... C08F 18/24 526/314 |
| 2012/0314183 A1* | 12/2012 | Nakamura ............ A61F 2/14 351/159.02 |
| 2017/0002019 A1* | 1/2017 | Stensrud ............ C07D 493/04 |

FOREIGN PATENT DOCUMENTS

| | | |
|---|---|---|
| EP | 0473163 A1 | 3/1992 |
| EP | 0595424 A2 | 5/1994 |
| WO | 2015094716 A1 | 6/2015 |

OTHER PUBLICATIONS

Yoshida et al., Derwent 02010190919A, JP 2010-190919.*
Mitsubishi Gas Chemical Co Inc, JP 2010190919A, Sep. 2, 2010. English translation of description.

* cited by examiner

*Primary Examiner* — Shane Fang
(74) *Attorney, Agent, or Firm* — The Webb Law Firm

(57) ABSTRACT

An exemplary polymerizable composition includes the reaction product of (a) diethyleneglycol bischloroformate; (b) allyl alcohol; (c) a cyclic polyol selected from the group consisting of a cycloaliphatic polyol having at least one secondary hydroxyl group, a heterocyclic polyol having primary and/or secondary hydroxyl groups, and mixtures thereof; (d) optionally, ethyleneglycol bischloroformate; and (e) optionally, at least one linear or branched aliphatic polyol having two to six hydroxyl groups. Another exemplary polymerizable composition includes the reaction product of (a) allyl alcohol; (b) a cyclic polyol selected from the group consisting of a cycloaliphatic polyol having at least one secondary hydroxyl group, a heterocyclic polyol having primary and/or secondary hydroxyl groups, and mixtures thereof; (c) ethyleneglycol bischloroformate; and (d) optionally, at least one linear or branched aliphatic polyol having two to six hydroxyl groups is also described. A reaction product, a polymerizate including the polymerizable composition, and an optical article including the polymerizable composition are also provided.

18 Claims, 1 Drawing Sheet

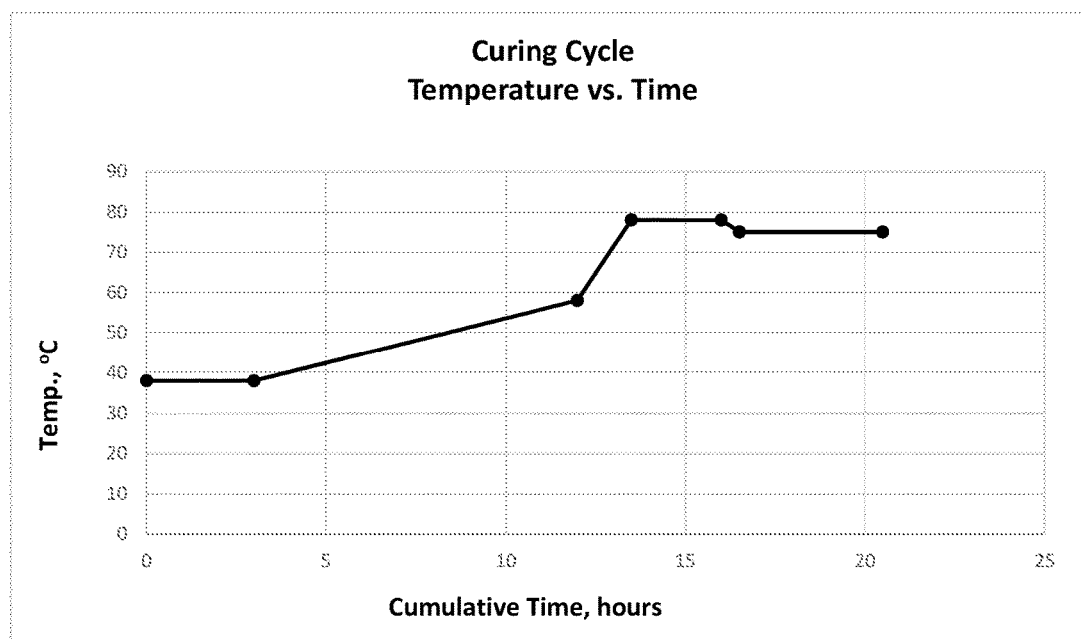

COMPOSITION FOR OPTICAL ARTICLES AND OPTICAL ARTICLES MADE THEREWITH

CROSS REFERENCE TO RELATED APPLICATION

This application claims the benefit of priority of U.S. Provisional Application No. 62/215,250, filed Sep. 8, 2015, which is incorporated by reference herein in its entirety.

BACKGROUND OF THE INVENTION

Field of the Invention

This invention relates generally to a polymerizable composition and to the polymerizate, which are particularly well suited for optical articles.

Technical Considerations

Allyl carbonate monomer compositions can be polymerized to use as transparent coatings, optical lenses, and other optical elements. Diethylene glycol bis(allyl carbonate) monomer compositions have been produced by reacting diethylene glycol with phosgene at temperatures between 0° C. and 20° C. to form the corresponding dichloroformate, which is then reacted with allyl alcohol in the presence of a suitable acid acceptor, for example, pyridine, a tertiary amine, or an alkaline or alkaline earth metal hydroxide. Alternatively, the allyl alcohol is reacted with phosgene. The resulting chloroformate is reacted with diethylene glycol in the presence of an alkaline reagent.

One problem associated with the polymerization of the known diethylene glycol bis(allyl carbonate) monomer compositions is the relatively high shrinkage of the polymerized material, which occurs during the course of polymerization to the final thermoset polymer. For example, there can be a shrinkage of greater than 13 percent during the polymerization of a conventional diethylene glycol bis(allyl carbonate) monomer. Shrinkage to such a degree is particularly detrimental in casting operations, such as those used to produce ophthalmic lenses and ophthalmic lens blanks, where the liquid monomer composition is introduced to a mold and then polymerized to the final thermoset polymer. This shrinkage can result in commercially unacceptable products that must be rejected, decreasing the yield of the process.

It is known that shrinkage in the mold may be reduced by introducing a liquid prepolymer into the mold and then polymerizing the prepolymer to the final thermoset polymer. In this known system, the prepolymer is produced by partially polymerizing the diethylene glycol bis(allyl carbonate) monomer composition to consume a portion of the polymerizable ethylenic double bonds.

Low shrinkage in the mold is favored by utilizing a large number of polymerizable ethylenic double bonds during partial polymerization to produce the prepolymer, which is introduced into the mold. However, during the partial polymerization of the diethylene glycol bis(allyl carbonate) monomer compositions, the viscosity increases as polymerizable ethylenic double bonds are consumed. For practical purposes, the viscosity should not become so high that the resulting prepolymer does not flow reasonably readily into the mold. Viscosity of the prepolymer, therefore, provides a practical lower limit to shrinkage in the mold. Production of the prepolymer can also cause processing difficulties, such as potential gelling of the reactor. It is a disadvantage to pre-polymerize the double bond structure. Production costs can be reduced and numerous problems can be avoided by eliminating the pre-thickening step.

Another challenge with conventional low shrinkage compositions is that they typically have increased length between cross-links, which produces soft polymers.

Therefore, it would be desirable to provide a reduced shrinkage composition that optimizes or improves the balance between the amount of polymerization shrinkage reduction and the final polymer's properties, for example, such that the final polymer is rigid enough to be used in various applications, such as conventional optical applications.

SUMMARY OF THE INVENTION

A polymerizable composition comprises the reaction product of (a) diethyleneglycol bischloroformate; (b) allyl alcohol; (c) a cyclic polyol selected from the group consisting of a cycloaliphatic polyol having at least one secondary hydroxyl group, a heterocyclic polyol having primary and/or secondary hydroxyl groups, and mixtures thereof; (d) optionally, ethyleneglycol bischloroformate; and (e) optionally, at least one linear or branched aliphatic polyol having two to six hydroxyl groups.

A polymerizable composition comprises the reaction product of (a) allyl alcohol; (b) a cyclic polyol selected from the group consisting of a cycloaliphatic polyol having at least one secondary hydroxyl group, a heterocyclic polyol having primary and/or secondary hydroxyl groups, and mixtures thereof; (c) ethyleneglycol bischloroformate; and (d) optionally, at least one linear or branched aliphatic polyol having two to six hydroxyl groups is also described.

A polymerizate and/or an optical article comprising the polymerizable compositions of the invention are also provided.

BRIEF DESCRIPTION OF THE DRAWING

FIG. 1 is a plot illustrating the cure cycle described in Table 3.

DESCRIPTION OF THE INVENTION

All numbers used in the specification and claims are to be understood as being modified in all instances by the term "about". All ranges disclosed herein are to be understood to encompass the beginning and ending range values and any and all subranges subsumed therein. The ranges set forth herein represent the average values over the specified range. The terms "polymer" or "polymeric" include oligomers, homopolymers, copolymers, and terpolymers.

The invention comprises, consists of, or consists essentially of the following aspects of the invention, in any combination.

The present invention relates to a polymerizable composition for preparing optical articles with reduced shrinkage compared to conventional polymerizable compositions. The present invention also relates to polymerizates, e.g., lenses, obtained from the compositions.

For example, the invention can comprise a polymerizable composition comprising the reaction product of (a) diethyleneglycol bischloroformate; (b) allyl alcohol; (c) a cyclic polyol selected from the group consisting of a cycloaliphatic polyol having at least one secondary hydroxyl group, a heterocyclic polyol having primary and/or secondary hydroxyl groups, and mixtures thereof; (d) optionally, ethyleneglycol bischloroformate; and (e) optionally, at least one linear or branched aliphatic polyol having two to six hydroxyl groups.

The amount of allyl alcohol, cyclic polyol, and linear or branched aliphatic polyol are relative to the total amount of all bischloroformates that are present. For example, allyl alcohol can be present in the range of 0.4 to 1.99 equivalent (eq.) of OH to 1 eq. of chloroformate, such as 0.8 to 1.2 eq. of OH to 1 eq. of chloroformate. For example, a minimum amount of allyl alcohol can be present in the range of 0.4 to 0.7 eq. of OH to 1 eq. of chloroformate. The cyclic polyol can be present in the range of 0.01 to 0.6 eq. of OH to 1 eq. of chloroformate, such as 0.05 to 0.3 eq. of OH to 1 eq. of chloroformate.

If present, the optional ethyleneglycol bischloroformate can be present in the range of 0.01 to 0.99 eq. of chloroformate, given that the total number of equivalents of chloroformate of all bischloroformate compounds is 1.

If present, the optional at least one linear or branched aliphatic polyol can be present in the range of 0.01 to 0.6 eq. of OH to 1 eq. of chloroformate. For example, two aliphatic polyols, ethylene glycol and diethylene glycol can both be present. For example, ethylene glycol can be present in the range of 0.025 to 0.1 eq. of OH to 1 eq. of chloroformate and diethylene glycol can be present in the range of 0 to 0.1 eq. of OH to 1 eq. of chloroformate.

For example, the polymerizable composition can also comprise the reaction product of (a) allyl alcohol; (b) a cyclic polyol selected from the group consisting of a cycloaliphatic polyol having at least one secondary hydroxyl group, a heterocyclic polyol having primary and/or secondary hydroxyl groups, and mixtures thereof; (c) ethyleneglycol bischloroformate; and (d) optionally, at least one linear or branched aliphatic polyol having two to six hydroxyl groups.

The amount of allyl alcohol, cyclic polyol, and linear or branched aliphatic polyol present are relative to the amount of ethyleneglycol bischloroformate that is present.

Allyl alcohol can be present in the range of 0.4 to 1.99 eq. of OH to 1 eq. of chloroformate. For example, a minimum amount of allyl alcohol present can be in the range of 0.4 to 0.7 eq. of OH to 1 eq. of chloroformate.

The cyclic polyol can be present in the range of 0.01 to 0.6 eq. of OH to 1 eq. of chloroformate.

If present, the optional at least one linear or branched aliphatic polyol can be present in the range of 0.01 to 0.6 eq. of OH to 1 eq. of chloroformate.

For the polymerizable compositions of the invention, the allyl group of the allyl alcohol can be substituted or unsubstituted, as represented by the following general Formula III, $H_2C=C(R7)-CH_2-OH$, wherein R7 is hydrogen, halogen (e.g., chlorine or bromine), or a $C_1$ to $C_4$ alkyl group (e.g., methyl or ethyl).

The cyclic polyol can be a cycloaliphatic polyol. For example, the cycloaliphatic polyol can be monocyclic, polycyclic, or fused ring cycloaliphatic polyol. The cycloaliphatic polyol can have at least one secondary hydroxyl group. The cycloaliphatic polyol can have at least one hydroxyl group bonded directly to a cyclic ring of the polyol, such as cyclohexane diol. The monocyclic cycloaliphatic polyol can be a cyclohexane diol, for example, 1,4-cyclohexane diol, 1,3-cyclohexane diol, or 1,2-cyclohexane diol; cyclohexane triol, for example, 1,3,5-cyclohexane triol or 1,2,3-cyclohexane triol; cyclohexane tetrol; cyclohexane pentol; cyclohexane hexol; or cyclopentane diol, for example, 1,3-cyclopentane diol or 1,2-cyclopentane diol. The polycyclic cycloaliphatic polyol can be, for example, a bicyclo[2.2.1]heptane diol.

The cyclic polyol can also be a heterocyclic polyol. The heterocyclic polyol can have primary and/or secondary hydroxyl groups. The heterocyclic polyol heteroatoms can be, but are not limited to, sulfur, nitrogen, and/or oxygen. For example, the heterocyclic polyol can be 1,3,5-tris(2-hydroxyethyl)isocyanurate. The heterocyclic polyol can also be isohexide selected from the group consisting of isosorbide, isoidide, and isomannide. Isosorbide, isoidide, and isomannide can be D or L stereochemical configurations. As will be appreciated by one skilled in the art, one or more than one cyclic polyol can be present in the polymerizable composition.

The linear or branched aliphatic polyol can be a $C_2$-$C_{12}$ polyol with two to six hydroxyl groups. The linear or branched aliphatic polyol can contain heteroatoms such as, but are not limited to, sulfur, nitrogen, and/or oxygen. The linear or branched aliphatic polyol can be selected from the group consisting of ethylene glycol, diethylene glycol, propylene glycol, 1, 3-propanediol, 1,2-butanediol, 1,4-butanediol, neopentyl glycol, 2-methyl-1,3-propanediol, glycerol, trimethylolpropane, ditrimethylolpropane, pentaerythritol, dipentaerythritol, erythritol, meso-erythritol, xylitol, sorbitol, ethoxylates thereof, propoxylates thereof, and mixtures of any of the foregoing. As will be appreciated by one skilled in the art, if present, one or more than one linear or branched aliphatic polyol can be used. For example, ethylene glycol can be used alone. Or, for example, ethylene glycol and diethylene glycol can be used together.

For example, the composition can include diethylene glycol bischloroformate in an amount to provide 1 equivalent of chloroformate, allyl alcohol in an amount to provide in the range of 0.8 to 1.2 eq. of OH, ethylene glycol in an amount to provide 0.05 eq. of OH, and D-Isosorbide in an amount to provide 0.15 eq. of OH.

As another example, the composition can include diethyleneglycol bischloroformate in an amount to provide 1 equivalent of chloroformate, allyl alcohol in an amount to provide in the range of 0.8 to 1.2 eq. of OH, ethylene glycol in an amount to provide 0.0667 eq. of OH, diethylene glycol in an amount to provide 0.0667 eq. of OH, and D-Isosorbide in an amount to provide 0.10 eq. of OH.

The equivalents ratio of total equivalents of hydroxyls to total equivalents of chloroformate can be in the range of 1 to 2:1, such as 1 to 1.5:1 or 1 to 1.3:1. The hydroxyls present in the mixture are from the allyl alcohol and polyols.

The polymerizable composition of the present invention can further comprise an additional component. For example, the additional component can be selected from the group consisting of triallylcyanurate, triallylisocyanurate, 1,3,5-tris(2-hydroxyethyl)isocyanurate tris(allyl carbonate), trimethylolpropane tris(allyl carbonate), pentaerythritol tetra(allyl carbonate), glycerol tris(allyl carbonate), ditrimethylolpropane tetra(allyl carbonate), diallylitaconate, dipentaerythritol hexa(allyl carbonate), and mixtures thereof.

The reaction product of the polymerizable composition can comprise at least one compound represented by:

(a) Formula I

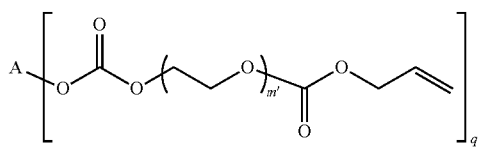

in which A represents a residue from the at least one cyclic polyol, m' is equal to 1 or 2, and q is equal to the number of hydroxyl groups on the at least one cyclic polyol; and (b) at least one of Formula II

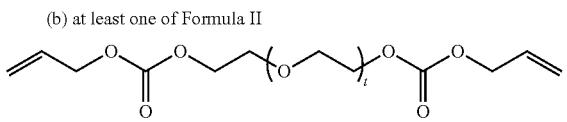

in which t is equal to 0 or 1. The reaction product can include a mixture of Formula II where t is equal to 0 and t is equal to 1.

The reaction product of the polymerizable composition can also comprise at least one compound represented by:

(a) Formula I'

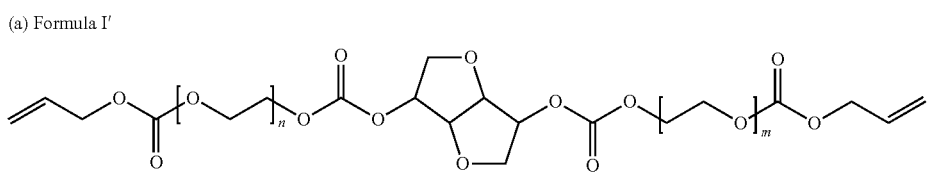

in which m and n are each independently 1 or 2; and
(b) at least one of Formula II in which t is equal to 0 or 1. The reaction product can include a mixture of Formula II where t is equal to 0 and t is equal to 1.

When at least one linear or branched aliphatic polyol is present, the reaction product of the polymerizable composition can comprise at least one compound represented by:
(a) Formula I in which A represents a residue from the at least one cyclic polyol, m' is equal to 1 or 2, and q is equal to the number of hydroxyl groups on the at least one cyclic polyol; and (b) Formula II'

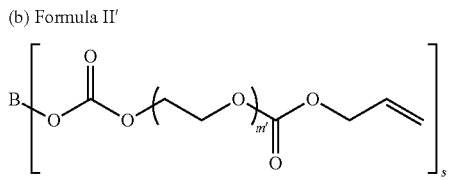

in which B represents a residue from the at least one linear or branched aliphatic polyol, m' is equal to 1 or 2, and s is equal to the number of hydroxyl groups on the at least one linear or branched aliphatic polyol; and
(c) at least one of Formula II in which t is equal to 0 or 1. The reaction product can include a mixture of Formula II where t is equal to 0 and t is equal to 1.

When at least one linear or branched aliphatic polyol is present, the reaction product of the polymerizable composition can also comprise at least one compound represented by:
(a) Formula I' in which m and n are each independently 1 or 2; and
(b) Formula II' in which B represents a residue of the at least one linear or branched aliphatic polyol, m' is equal to 1 or 2, and s is equal to the number of hydroxyl groups on the at least one linear or branched aliphatic polyol; and
(c) at least one of Formula II in which t is equal to 0 or 1. The reaction product can include a mixture of Formula II where t is equal to 0 and t is equal to 1.

The reaction product may also contain higher order oligomers of the composition components and/or small amounts of unreacted or partially reacted components.

The present invention also provides for a polymerizate comprising the polymerizable composition, as well as an optical article comprising the polymerizable composition. For example, the polymerizate can have a refractive index in the range of 1.44 to 1.56, such as 1.47 to 1.53, such as 1.49 to 1.51, such as 1.495 to 1.505. The refractive index can be measured using $n_e$ which is the refractive index measured at 20° C. at the mercury e-line (546.07 nm).

Polymerization of the polymerizable composition of the invention may be accomplished by adding to the composition an initiating amount of material capable of generating free radicals, i.e., an initiator. Examples of suitable initiators include organic peroxy compounds. Methods for polymerizing polyol(allyl carbonate) compositions are well known to the skilled artisan and any of those well-known techniques may be used to polymerize the polymerizable compositions of the invention.

Suitable examples of radical initiators that may be used can include organic peroxides, such as peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, and p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and mixtures thereof. Suitable initiators are those that do not discolor the resulting polymerizate.

The amount of initiator used to initiate and polymerize the polymerizable compositions of the invention may vary and will depend on the particular initiator used. An initiating amount of the initiator, i.e., the amount needed to initiate and sustain the polymerization reaction, may be utilized. However, more than the initiating amount can be used. For example, the amount of initiator and the consequent cure cycle can be selected to produce a polymerizate having a Fischer microhardness of at least 5, such as at least 10, such as at least 15, such as at least 20. The Fischer microhardness can be, e.g., in the range of 20 to 150. The Fischer microhardness can be determined by testing according to ISO 14577-07 using a FISCHERSCOPE® H-100SMC available from Fischer Technology, Inc. Typically, the cure cycle involves heating the polymerizable organic composition in the presence of the initiator from room temperature up to a temperature in the range of 75 to 105° C. over a period of 15 hours to 30 hours.

Various conventional additives may be incorporated into the polymerizable composition of the invention. Such conventional additives may include light stabilizers, heat stabilizers, ultraviolet light absorbers, mold release agents, dyes, pigments, flexibilizing additives that are not radically polymerizable, e.g., alkoxylated phenol benzoates and poly (alkylene glycol) dibenzoates, antioxidants such as hindered phenol antioxidants, and polymerization inhibitors or shelf-life stabilizers such as 4-methoxyphenol (MEHQ), 2,6-bis (1,1-dimethylethyl)-4-methylphenol (BHT), or triphenyl phosphite. Conventional additives can be present in amounts totaling less than 10 percent by weight, such as less than 5 percent by weight, such as less than 3 percent by weight, based on the total weight of the polymerizable composition.

As previously mentioned, the invention is directed to the polymerizates obtained from polymerization of the polymerizable compositions. The polymerizates of the invention can be solid, transparent and substantially free of optical defects. Solid articles that may be prepared from the polymerizable compositions of the invention include, but are not limited to, optical lenses, such as plano and ophthalmic lenses, sun lenses or sunglasses.

EXAMPLES

Part 1: Preparation of Polymerizable Compositions

For each of the Examples (Table 1) and Comparative Examples (Table 2), a 500 ml 5-neck flask was equipped with an overhead mechanical mixer, a thermocouple probe, and an inlet for a motorized syringe pump. Each example was scaled to a total reaction mixture of approximately 250 g. The quantities listed in Table 1 and Table 2 relate to the reactive equivalents of each component (specifically, chloroformate and hydroxyl).

A cooling bath was prepared by mixing approximately one part sodium chloride, two parts water, and four parts ice chunks in a large plastic dish. Dry ice was added periodically to maintain a bath temperature between −15 and −17° C.

The diethylene glycol (bis)chloroformate and, in Example 6, ethylene glycol (bis)chloroformate was added to the reaction flask. For the following examples, a total of 0.835 equivalents of reactive chloroformate were added.

In accordance with Table 1 and Table 2, for each example and comparative example, the indicated relative hydroxy equivalents of allyl alcohol, polyol(s) and/or cyclic polyols were added to the reaction flask with 11.5 g CR-39® monomer (available from PPG Industries, Inc.). Any solid polyols were first pre-dissolved in the allyl alcohol prior to being added to the reaction flask.

The reaction components were thoroughly mixed together in the reaction flask and cooled with the ice/salt water bath to an initial temperature of approximately −2° C.

Vigorous mixing of the reaction mixture was established and a 30% excess of 50% aqueous sodium hydroxide relative to chloroformate was added via a syringe pump at a rate to maintain the reaction temperature between 10 to 15° C., typically over a period of 25 to 40 minutes. After the addition was completed, mixing was continued for approximately 5 minutes at 10 to 15° C., followed by rinsing the sides of the reactor with a small portion of water. Mixing was continued an additional 5 minutes, after which the mixture was transferred to a separatory flask to which 100 to 135 ml water was added to remove the salt by-products. The mixture was then agitated for approximately 3 minutes and the organic and aqueous phases were allowed to separate. A chloroformate test of the organic layer was performed using chloroformate test paper (chloroformate test paper, part #1-200-250, commercially available from DOD Technologies, Inc.). If the presence of chloroformate was indicated, the mixture was stirred an additional 3 to 10 minutes. The phases were allowed to separate, and the aqueous phase was then removed. The organic phase was again tested for chloroformate; if present, an additional small amount of 50% aqueous sodium hydroxide was added, followed by 3 minutes agitation. If necessary, this process was repeated until chloroformate was consumed.

The organic product was then washed with approximately 100 milliliters of water. The water washing process was repeated until the pH of the wash water was less than 8.

Residual water and other volatiles were removed by vacuum distillation at a pressure of 1 Torr, while the temperature was gradually increased from room temperature to approximately 135° C. The distillation was maintained at 135° C. for 25 to 30 minutes at 1 Torr.

The resulting compositions were cast according to the procedure in Part 2.

TABLE 1

Curable compositions comprising cyclic polyols. All quantities are expressed in terms of either chloroformate or hydroxyl reactive equivalents

| | Example # | | | | | | |
|---|---|---|---|---|---|---|---|
| Component | 1 | 2 | 3 | 4 | 5 | 6 | 7 |
| Diethylene glycol (bis)chloroformate | 2 | 2 | 2 | 2 | 2 | 1.6 | 2 |
| Ethylene glycol (bis)chloroformate | — | — | — | — | — | 0.4 | — |
| Allyl alcohol | 2 | 2 | 2 | 2 | 2 | 2 | 1.7 |
| 1,2-cyclohexane-diol | 0.4 | — | — | — | — | — | — |
| 1,4-cyclohexane-diol | — | 0.4 | — | — | — | — | — |
| isosorbide | — | — | 0.4 | — | 0.3 | 0.3 | 0.3 |
| THEIC[1] | — | — | — | 0.4 | — | — | 0.2 |
| ethylene glycol | — | — | — | — | 0.1 | 0.1 | 0.2 |

[1]Tris (2-hydroxyethyl) Isocyanurate

TABLE 2

Comparative Examples. All quantities are expressed in terms of either chloroformate or hydroxyl reactive equivalents.

| | Comparative Example # | | | | |
|---|---|---|---|---|---|
| Component | CE-8 | CE-9 | CE-10 | CE-11 | CE-12 |
| Diethylene glycol (bis)chloroformate | 2 | 2 | 2 | 2 | 2 |
| allyl alcohol | 2.4 | 2 | 2 | 2 | 2 |
| Ethylene glycol | — | 0.4 | — | — | — |
| Diethylene glycol | — | — | 0.4 | — | — |
| Trimethylol propane | — | — | — | 0.4 | — |
| pentaerythritol ethoxylate[1] | — | — | — | — | 0.4 |

[1]Pentaerythritol ethoxylate (3/4 EO/OH), approximate Mn 270

Part 2: General Casting Procedure

For each example, 20.0 grams of the monomer made in Part 1 and 1.0 gram of TRIGONOX® ADC-NS60 peroxide initiator (a 60% mixture of peroxydicarbonates in diethylene glycol bis(allyl carbonate), available from Akzo Nobel Polymer Chemicals LLC) were placed in a small plastic bottle and thoroughly mixed for approximately 15 minutes with a magnetic stirrer. The resulting solutions were each filled into a mold assembly having two flat disk-shaped tempered glass molds (approximately 80 mm in diameter), separated by a 3.4 mm thick, 74 mm diameter PVC gasket and clamped together. The mold assembly was placed in a programmable oven, and each sample was polymerized using the cure cycle described in Table 3 and FIG. 1.

TABLE 3

Cure conditions

| Step | Cumulative Hours | Temperature |
|---|---|---|
| 1 | 0 | 38° C. (initial) |
| 2 | 3 | 38° C. (hold @ 38° C.) |
| 3 | 12 | 58° C. (ramp from 38 to 58° C.) |
| 4 | 13.5 | 78° C. (ramp from 58 to 78° C.) |
| 5 | 16 | 78° C. (hold @ 78° C.) |
| 6 | 16.5 | 75° C. (ramp from 78 to 75° C.) |
| 7 | 20.5 | 75° C. (hold) |

The resulting flat disk-shaped cured polymer piece was removed from the mold assembly and annealed at 80° C. for 30 minutes. Properties were measured according to the test methods described below.

Part 3. Determination of Properties

The following properties were measured and are tabulated in Table 4.

3A. Polymerization Shrinkage

The amount of polymerization shrinkage was calculated according to Eq. 1 shown below, using the monomer density and polymer density, both measured at 25° C.:

% Shrinkage=[(polymer density−monomer density)/polymer density]×100%        [Eq.1]

3B. Fischer Microhardness (FMH)

The Fischer microhardness was determined by testing according to ISO 14577-07 using a FISCHERSCOPE® H-100SMC (available from Fischer Technology, Inc.). The Fischer microhardness of polymerizates (±3 Newtons/mm$^2$) was measured at a load of 300 milliNewton (mN), following a load application of 0-300 mN in 15 seconds. The results are an arithmetic average of 5 measurements. Higher Fischer microhardness is typically desirable for improved processing of optical lenses, such as during cutting, grinding and polishing operations.

DMA Analysis (E')

The DMA analysis was carried out according to ASTM D5023 "Standard Test Method for Plastics: Dynamic Mechanical Properties: In Flexure (Three-Point Bending)" using a Perkin Elmer Diamond DMA. The storage modulus measured at 75° C. was reported as "DMA E' @75° C.". In general, higher storage modulus (E') is desirable for improved resistance to distortion during processing of optical materials at high temperatures.

Refractive Index

Refractive index ($n_e$) was measured at 546 nm (mercury e-line) at 20° C. according to ASTM C1648-06, using a Metricon Model 2010M Prism Coupler (available from Metricon Corp.).

TABLE 4

Properties of cured compositions

| Example # | % Shrinkage | FMH*** | Storage modulus E' @ 75° C.*** | Refractive Index $n_e$ |
|---|---|---|---|---|
| Example 1 | 11.9 | 89 | 0.43 | 1.5012 |
| Example 2 | 11.8 | 91 | 0.42 | 1.5015 |
| Example 3 | 10.3 | 115 | 0.38 | 1.5014 |
| Example 4 | 10.6 | 117 | 0.48 | 1.5036 |
| Example 5 | 10.5 | 107 | 0.37 | 1.5013 |
| Example 6 | 10.8 | 120 | 0.66 | 1.5016 |
| Example 7 | 9.5 | 117 | 0.22 | 1.5017 |
| CE-8 | 12.7 | 95 | 0.53 | 1.5015 |
| CE-9 | 11.6 | 88 | 0.35 | 1.5005 |
| CE-10 | 11.1 | 70 | 0.17 | 1.4997 |
| CE-11 | 11.5 | 88 | 0.34 | 1.501 |
| CE-12 | 10.8 | 57 | 0.16 | 1.4997 |

The results above demonstrate that although acyclic aliphatic polyols can result in slightly reduced shrinkage, this is often accompanied by softer films and in some cases much lower storage modulus. The use of cyclic polyols not only improves shrinkage, but this is accomplished without compromising hardness or modulus.

The invention can be further characterized in the following numbered clauses:

Clause 1. A polymerizable composition, comprising the reaction product of (a) diethyleneglycol bischloroformate; (b) allyl alcohol; (c) a cyclic polyol selected from the group consisting of a cycloaliphatic polyol having at least one secondary hydroxyl group, a heterocyclic polyol having primary and/or secondary hydroxyl groups, and mixtures thereof; (d) optionally, ethyleneglycol bischloroformate; and (e) optionally, at least one linear or branched aliphatic polyol having two to six hydroxyl groups.

Clause 2. The polymerizable composition of clause 1, wherein the aliphatic polyol (e) is present and comprises a $C_2$-$C_{12}$ polyol with two to six hydroxyl groups.

Clause 3. The polymerizable composition of clause 1, wherein the aliphatic polyol (e) is present and is selected from the group consisting of ethylene glycol, diethylene glycol, propylene glycol, 1,3-propanediol, 1,2-butanediol, 1,4-butanediol, neopentyl glycol, 2-methyl-1, 3-propanediol, glycerol, trimethylolpropane, ditrimethylolpropane, pentaerythritol, dipentaerythritol, erythritol, meso-erythritol, xylitol, sorbitol, ethoxylates thereof, propoxylates thereof, and mixtures of any of the foregoing.

Clause 4. The polymerizable composition of any of clauses 1 to 3, wherein the heterocyclic polyol (c) is selected from the group consisting of isohexide, 1,3,5-tris (2-hydroxyethyl)isocyanurate, and mixtures thereof.

Clause 5. The polymerizable composition of any of clauses 1 to 4, wherein the heterocyclic polyol (c) is isohexide selected from the group consisting of isosorbide, isoidide, and isomannide.

Clause 6. The polymerizable composition of any of clauses 1 to 5, wherein an equivalents ratio of total equivalents of hydroxyls to total equivalents of chloroformate is 1 to 1.5:1.

Clause 7. The polymerizable composition of any of clauses 1 to 6, wherein the composition further comprises an additional component selected from the group consisting of triallylcyanurate, triallylisocyanurate, 1,3,5-tris(2-hydroxyethyl)isocyanurate tris(allyl carbonate), trimethylolpropane tris(allyl carbonate), pentaerythritol tetra(allyl carbonate), glycerol tris(allyl carbonate), ditrimethylolpropane tetra(allyl carbonate), diallylitaconate, dipentaerythritol hexa(allyl carbonate), and mixtures thereof.

Clause 8. The polymerizable composition of any of clauses 1 to 7, wherein the reaction product comprises at least one compound represented by:

(a) Formula I $$A \left[ O-\overset{O}{\underset{O}{C}}-O-(CH_2CH_2O)_{m'}-\overset{O}{\underset{O}{C}}-O-CH_2CH=CH_2 \right]_q$$

where A represents a residue from the at least one cyclic polyol,
m' is equal to 1 or 2, and
q is equal to the number of hydroxyl groups on the at least one cyclic polyol; and (b) at least one of Formula II $$CH_2=CHCH_2-O-\overset{O}{\underset{O}{C}}-O-CH_2CH_2-(O-CH_2CH_2)_t-O-\overset{O}{\underset{O}{C}}-O-CH_2CH=CH_2$$

where t is equal to 0 or 1.

Clause 9. The polymerizable composition of any of clauses 1 to 8, wherein the reaction product comprises at least one compound represented by:

(a) Formula I'

$$CH_2=CHCH_2-O-\overset{O}{\underset{O}{C}}-O-(CH_2CH_2O)_n-\overset{O}{\underset{O}{C}}-O-\text{[isosorbide]}-O-\overset{O}{\underset{O}{C}}-O-(CH_2CH_2O)_m-\overset{O}{\underset{O}{C}}-O-CH_2CH=CH_2$$

where m and n are each independently 1 or 2; and (b) at least one of Formula II $$CH_2=CHCH_2-O-\overset{O}{\underset{O}{C}}-O-CH_2CH_2-(O-CH_2CH_2)_t-O-\overset{O}{\underset{O}{C}}-O-CH_2CH=CH_2$$

where t is equal to 0 or 1.

Clause 10. The polymerizable composition of any of clauses 1 to 7, wherein the reaction product comprises at least one compound represented by:

(a) Formula I $$A \left[ O-\overset{O}{\underset{O}{C}}-O-(CH_2CH_2O)_{m'}-\overset{O}{\underset{O}{C}}-O-CH_2CH=CH_2 \right]_q$$

where A represents a residue from the at least one cyclic polyol,
m' is equal to 1 or 2, and
q is equal to the number of hydroxyl groups on the at least one cyclic polyol; and (b) Formula II'

$$B \left[ O-\overset{O}{\underset{O}{C}}-O-(CH_2CH_2O)_{m'}-\overset{O}{\underset{O}{C}}-O-CH_2CH=CH_2 \right]_s$$

where B represents a residue from the at least one linear or branched aliphatic polyol,
m' is equal to 1 or 2, and
s is equal to the number of hydroxyl groups on the at least one linear or branched aliphatic polyol; and (c) at least one of Formula II $$CH_2=CHCH_2-O-\overset{O}{\underset{O}{C}}-O-CH_2CH_2-(O-CH_2CH_2)_t-O-\overset{O}{\underset{O}{C}}-O-CH_2CH=CH_2$$

where t is equal to 0 or 1.

Clause 11. The polymerizable composition of any of clauses 1 to 7 and 10, wherein the reaction product comprises at least one compound represented by:

(a) Formula I'

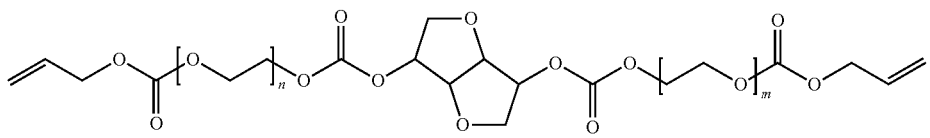

where m and n are each independently 1 or 2; and (b) Formula II'

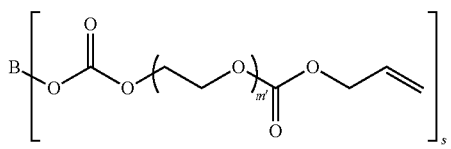

where B represents a residue of the at least one linear or branched aliphatic polyol,
m' is equal to 1 or 2, and
s is equal to the number of hydroxyl groups on the at least one linear or branched aliphatic polyol; and (c) at least one of Formula II

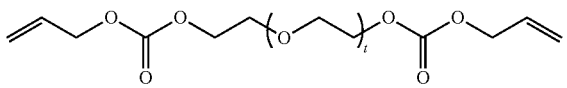

where t is equal to 0 or 1.

Clause 12. A polymerizable composition, comprising the reaction product of (a) allyl alcohol; (b) a cyclic polyol selected from the group consisting of a cycloaliphatic polyol having at least one secondary hydroxyl group, a heterocyclic polyol having primary and/or secondary hydroxyl groups, and mixtures thereof; (c) ethyleneglycol bischloroformate; and (d) optionally, at least one linear or branched aliphatic polyol having two to six hydroxyl groups.

Clause 13. The polymerizable composition of clause 12, wherein the aliphatic polyol (d) is present and comprises a $C_2$-$C_{12}$ polyol with two to six hydroxyl groups.

Clause 14. The polymerizable composition of clause 12, wherein the aliphatic polyol (d) is present and is selected from the group consisting of ethylene glycol, diethylene glycol, propylene glycol, 1,3-propanediol, 1,2-butanediol, 1,4-butanediol, neopentyl glycol, 2-methyl-1, 3-propanediol, glycerol, trimethylolpropane, ditrimethylolpropane, pentaerythritol, dipentaerythritol, erythritol, meso-erythritol, xylitol, sorbitol, ethoxylates thereof, propoxylates thereof, and mixtures of any of the foregoing.

Clause 15. The polymerizable composition of any of clauses 12 to 14, wherein the heterocyclic polyol (b) is selected from the group consisting of isohexide, 1,3,5-tris (2-hydroxyethyl)isocyanurate, and mixtures thereof.

Clause 16. The polymerizable composition of clause 15, wherein the heterocyclic polyol (b) is isohexide selected from the group consisting of isosorbide, isoidide, and isomannide.

Clause 17. The polymerizable composition of any of clauses 12 to 16, wherein an equivalents ratio of total equivalents of hydroxyls to total equivalents of chloroformate is 1 to 1.5:1.

Clause 18. The polymerizable composition of any of clauses 12 to 17, wherein the composition further comprises an additional component selected from the group consisting of triallylcyanurate, triallylisocyanurate, 1,3,5-tris(2-hydroxyethyl)isocyanurate tris(allyl carbonate), trimethylolpropane tris(allyl carbonate), pentaerythritol tetra(allyl carbonate), glycerol tris(allyl carbonate), ditrimethylolpropane tetra(allyl carbonate), diallylitaconate, dipentaerythritol hexa(allyl carbonate), and mixtures thereof.

Clause 19. The polymerizable composition of any of clauses 12 and 15 to 18, wherein the reaction product comprises at least one compound represented by:

(a) Formula I

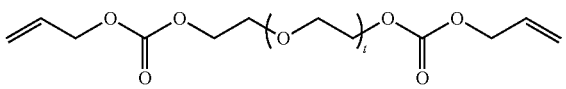

where A represents a residue from the at least one cyclic polyol,
m' is equal to 1 or 2, and
q is equal to the number of hydroxyl groups on the at least one cyclic polyol; and (b) at least one of Formula II

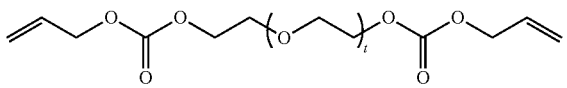

where t is equal to 0 or 1.

Clause 20. The polymerizable composition of any of clauses 12 and 15 to 19, wherein the reaction product comprises at least one compound represented by:

(a) Formula I′

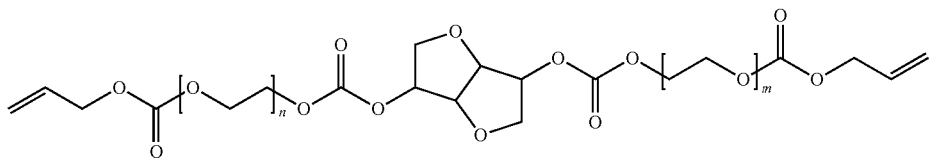

where m and n are each independently 1 or 2; and (b) at least one of Formula II

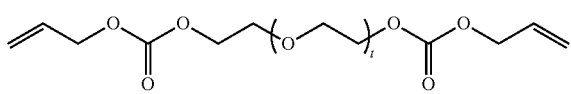

where t is equal to 0 or 1.

(c) at least one of Formula II

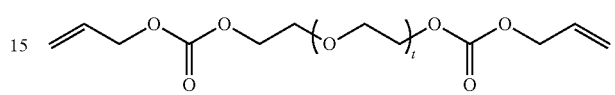

where t is equal to 0 or 1.

Clause 22. The polymerizable composition of any of clauses 12 to 18 and 21, wherein the reaction product comprises at least one compound represented by:

(a) Formula I′

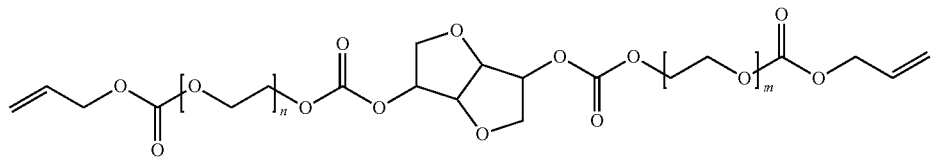

where m and n are each independently 1 or 2; and (b) Formula II′

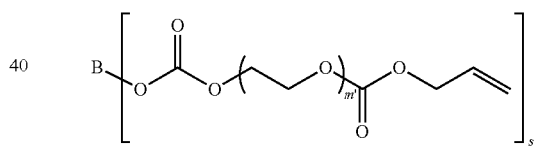

where B represents a residue of the at least one linear or branched aliphatic polyol,
m′ is equal to 1 or 2, and
s is equal to the number of hydroxyl groups on the at least one linear or branched aliphatic polyol; and Clause 21. The polymerizable composition of any of clauses 12 to 18, wherein the reaction product comprises at least one compound represented by:

(a) Formula I

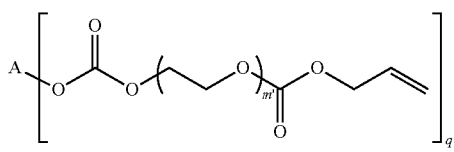

where A represents a residue from the at least one cyclic polyol,
m′ is equal to 1 or 2, and
q is equal to the number of hydroxyl groups on the at least one cyclic polyol; and (b) Formula II′

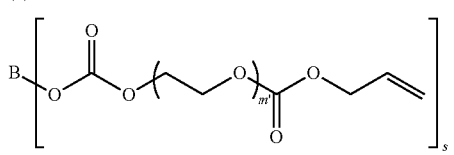

where B represents a residue from the at least one linear or branched aliphatic polyol,
m′ is equal to 1 or 2, and
s is equal to the number of hydroxyl groups on the at least one linear or branched aliphatic polyol; and (c) at least one of Formula II

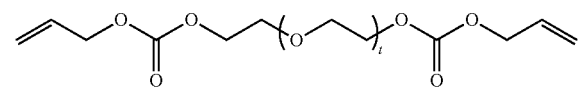

where t is equal to 0 or 1.

Clause 23. A polymerizate, comprising the polymerizable composition of any of clauses 1 to 11.

Clause 24. A polymerizate, comprising the polymerizable composition of any of clauses 12 to 23.

Clause 25. An optical article, comprising the polymerizable composition of any of clauses 1 to 11.

Clause 26. An optical article, comprising the polymerizable composition of any of clauses 12 to 23.

Clause 27. A polymerizable composition, comprising a radically polymerizable monomer represented by:

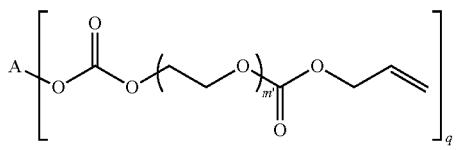

Formula I where A represents a residue from at least one cyclic polyol, m' is equal to 1 or 2, and q is equal to the number of hydroxyl groups on the at least one cyclic polyol.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A polymerizable thermosetting composition, comprising the reaction product of:
   (a) diethyleneglycol bischloroformate;
   (b) allyl alcohol;
   (c) a cyclic polyol selected from the group consisting of a cycloaliphatic polyol having at least one secondary hydroxyl group, a heterocyclic polyol having primary and/or secondary hydroxyl groups, and mixtures thereof;
   (d) optionally, ethyleneglycol bischloroformate; and
   (e) optionally, at least one linear or branched aliphatic polyol having two to six hydroxyl groups,
   wherein the allyl alcohol (b) is present in an amount of 0.4 to 1.99 equivalents of OH to 1 equivalent of chloroformate, and
   wherein the cyclic polyol (c) is present in an amount of 0.01 to 0.6 equivalents of OH to 1 equivalent of chloroformate.

2. The polymerizable composition of claim 1, wherein the aliphatic polyol (e) is present and comprises a $C_2$-$C_{12}$ polyol with two to six hydroxyl groups.

3. The polymerizable composition of claim 1, wherein the aliphatic polyol (e) is present and is selected from the group consisting of ethylene glycol, diethylene glycol, propylene glycol, 1,3-propanediol, 1,2-butanediol, 1,4-butanediol, neopentyl glycol, 2-methyl-1,3-propanediol, glycerol, trimethylolpropane, ditrimethylolpropane, pentaerythritol, dipentaerythritol, erythritol, meso-erythritol, xylitol, sorbitol, ethoxylates thereof, propoxylates thereof, and mixtures of any of the foregoing.

4. The polymerizable composition of claim 1, wherein the heterocyclic polyol (c) is selected from the group consisting of isohexide, 1,3,5-tris(2-hydroxyethyl)isocyanurate, and mixtures thereof.

5. The polymerizable composition of claim 4, wherein the heterocyclic polyol (c) is isohexide selected from the group consisting of isosorbide, isoidide, and isomannide.

6. The polymerizable composition of claim 1, wherein an equivalents ratio of total equivalents of hydroxyls to total equivalents of chloroformate is 1 to 1.5:1.

7. The polymerizable composition of claim 1, wherein the composition further comprises an additional component selected from the group consisting of triallylcyanurate, triallylisocyanurate, 1,3,5-tris(2-hydroxyethyl)isocyanurate tris(allyl carbonate), trimethylolpropane tris(allyl carbonate), pentaerythritol tetra(allyl carbonate), glycerol tris(allyl carbonate), ditrimethylolpropane tetra(allyl carbonate), diallylitaconate, dipentaerythritol hexa(allyl carbonate), and mixtures thereof.

8. The polymerizable composition of claim 1, wherein the reaction product comprises at least one compound represented by:

(a) Formula I

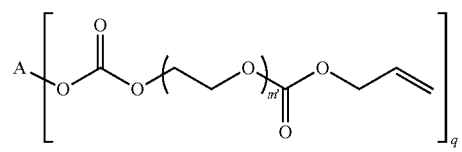

where A represents a residue from the at least one cyclic polyol, m' is equal to 1 or 2, and q is equal to the number of hydroxyl groups on the at least one cyclic polyol; and (b) at least one of Formula II

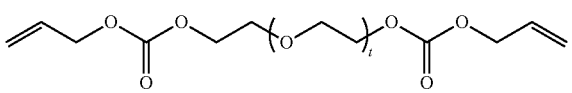

where t is equal to 0 or 1.

9. The polymerizable composition of claim 1, wherein the reaction product comprises at least one compound represented by:

(a) Formula I′

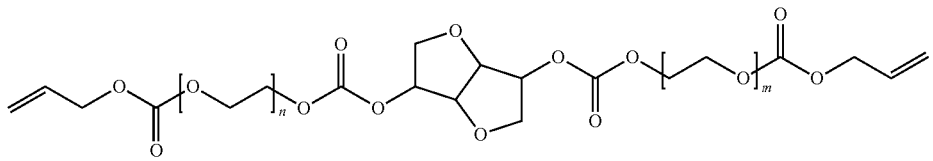

where m and n are each independently 1 or 2; and (b) at least one of Formula II

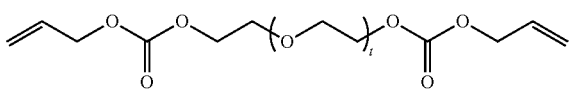

where t is equal to 0 or 1.

(c) at least one of Formula II

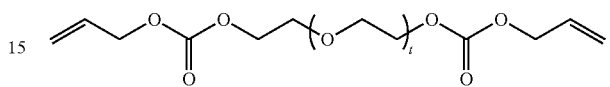

where t is equal to 0 or 1.

11. The polymerizable composition of claim 1, wherein the reaction product comprises at least one compound represented by:

(a) Formula I′

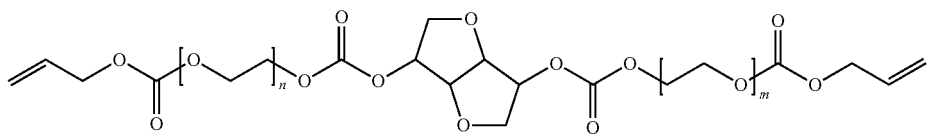

where m and n are each independently 1 or 2; and (b) Formula II′

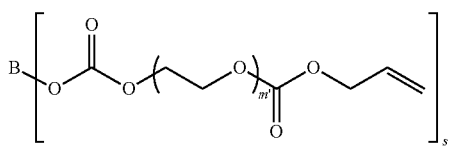

where B represents a residue of the at least one linear or branched aliphatic polyol,
m′ is equal to 1 or 2, and
s is equal to the number of hydroxyl groups on the at least one linear or branched aliphatic polyol; and (c) at least one of Formula II

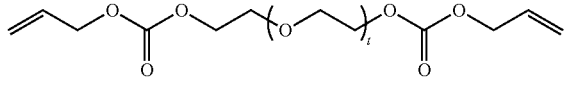

where t is equal to 0 or 1.

12. A polymerizate, formed from the polymerizable composition of claim 1.

13. An optical article, comprising the polymerizable composition of claim 1.

14. A polymerizable composition of claim 1, comprising a radically polymerizable monomer represented by:

10. The polymerizable composition of claim 1, wherein the reaction product comprises at least one compound represented by:

(a) Formula I

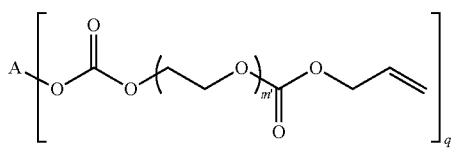

where A represents a residue from the at least one cyclic polyol,
m′ is equal to 1 or 2, and
q is equal to the number of hydroxyl groups on the at least one cyclic polyol; and (b) Formula II′

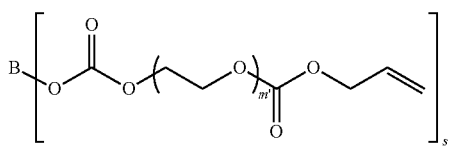

where B represents a residue from the at least one linear or branched aliphatic polyol,
m′ is equal to 1 or 2, and
s is equal to the number of hydroxyl groups on the at least one linear or branched aliphatic polyol; and Formula I

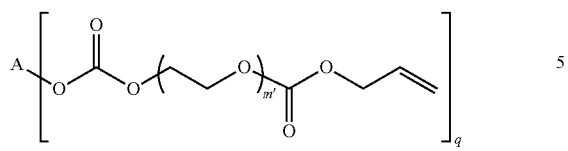

where A represents a residue from at least one cyclic polyol,
m' is equal to 1 or 2, and
q is equal to the number of hydroxyl groups on the at least one cyclic polyol.

15. The polymerizable composition of claim 1, further comprising organic peroxide.

16. The polymerizable composition of claim 15, wherein the organic peroxide is selected from the group consisting of peroxymonocarbonate ester, peroxydicarbonate ester, diacylperoxide, and peroxyester.

17. The polymerizable composition of claim 8, wherein in Formula I, the at least one cyclic polyol is isohexide selected from the group consisting of isosorbide, isoidide, and isomannide, and q is 2.

18. The polymerizable composition of claim 8 wherein the at least one linear or branched aliphatic polyol is present.

* * * * *